US007431986B2

(12) United States Patent
Van Lengerich et al.

(10) Patent No.: US 7,431,986 B2
(45) Date of Patent: Oct. 7, 2008

(54) ENCAPSULATION OF SENSITIVE COMPONENTS USING PRE-EMULSIFICATION

(75) Inventors: Bernhard H. Van Lengerich, Plymouth, MN (US); Lily Leung, Minneapolis, MN (US); Steven C. Robie, Plymouth, MN (US); Young Kang, Winter Garden, FL (US); Jamileh Lakkis, Minneapolis, MN (US); Thomas M. Jarl, Golden Valley, MN (US)

(73) Assignee: General Mills, Inc., Minneapolis, MN (US)

( * ) Notice: Subject to any disclaimer, the term of this patent is extended or adjusted under 35 U.S.C. 154(b) by 1104 days.

(21) Appl. No.: 10/205,146

(22) Filed: Jul. 24, 2002

(65) Prior Publication Data
US 2004/0017017 A1 Jan. 29, 2004

(51) Int. Cl.
*B32B 5/16* (2006.01)
*B01J 13/04* (2006.01)
*A61K 9/14* (2006.01)

(52) U.S. Cl. .............................. 428/402.2; 427/213.32; 427/213.35; 427/213.36; 264/4.3; 264/4.6

(58) Field of Classification Search ................ 264/4.1, 264/4.3, 4.32, 4.33, 4.6; 424/489; 426/89; 428/402, 402.2, 402.21; 427/213.3, 213.31, 427/213.32, 213.35, 213.36
See application file for complete search history.

(56) References Cited

U.S. PATENT DOCUMENTS

| | | | |
|---|---|---|---|
| 2,876,160 A | 3/1959 | Spencer et al. | |
| 3,027,102 A | 3/1962 | Lödige et al. | |
| 3,404,984 A | 10/1968 | Olsen | |
| 3,762,931 A | 10/1973 | Craig et al. | |
| 3,786,123 A | 1/1974 | Katzen | 264/53 |
| 3,868,471 A | 2/1975 | Decelles et al. | |
| 3,922,354 A | 11/1975 | Galluzzi et al. | |
| 3,925,343 A | 12/1975 | Hampton et al. | |
| 3,928,567 A | 12/1975 | Andersen et al. | |
| 3,962,415 A | 6/1976 | Katzen | 424/19 |
| 3,962,416 A | 6/1976 | Katzen | |
| 3,992,555 A | 11/1976 | Kovacs | |
| 4,075,356 A | 2/1978 | Haag et al. | |
| 4,106,991 A | 8/1978 | Markussen et al. | |
| 4,178,392 A | 12/1979 | Gobble et al. | |
| 4,187,321 A | 2/1980 | Mutai et al. | |
| 4,242,219 A | 12/1980 | Bogerman et al. | |
| 4,357,358 A | 11/1982 | Schanze | |
| 4,379,171 A | 4/1983 | Furda et al. | |
| 4,386,106 A | 5/1983 | Merritt et al. | |
| 4,532,145 A | 7/1985 | Saleeb et al. | |
| 4,689,235 A | 8/1987 | Barnes et al. | |
| 4,816,259 A | 3/1989 | Matthews et al. | |
| 4,820,534 A | 4/1989 | Saleeb et al. | |
| 4,871,574 A | 10/1989 | Yamazaki et al. | |
| 4,886,820 A | 12/1989 | Gross et al. | |
| 4,888,171 A | 12/1989 | Okonogi et al. | |
| 4,895,725 A | 1/1990 | Kantor et al. | 424/455 |
| 4,999,208 A | 3/1991 | van Lengerich et al. | |
| 5,009,900 A | 4/1991 | Levine et al. | |
| 5,023,083 A | 6/1991 | Drell | |
| 5,064,669 A * | 11/1991 | Tan et al. | 426/307 |
| 5,071,668 A | 12/1991 | van Lengerich et al. | |
| 5,074,902 A | 12/1991 | Connick, Jr. et al. | |
| 5,075,058 A | 12/1991 | Chan et al. | |

(Continued)

FOREIGN PATENT DOCUMENTS

DE 37 38 042 A 5/1988

(Continued)

OTHER PUBLICATIONS

Arshady R., "Microcapsules for Food," *Journal of Microencapsulation*, vol. 10, No. 4, pp. 413-435, Oct. 1, 1993, Taylor and Francis Inc., London, GB.

(Continued)

*Primary Examiner*—Thao Tran
(74) *Attorney, Agent, or Firm*—Douglas J. Taylor; Barry Hollander; Annette Frawley

(57) ABSTRACT

A stabilized emulsion is employed to produce shelf stable, controlled release, discrete, solid particles or pellets which contain an encapsulated and/or embedded component, such as a readily oxidizable component, such as omega-3 fatty acids. An oil encapsulant component which contains an active, sensitive encapsulant, dissolved and/or dispersed in an oil is admixed with an aqueous component and a film-forming component to form an emulsion. An antioxidant for prevention of oxidation of the active, sensitive encapsulant, and a film-softening component or plasticizer for the film-forming component may be included in the emulsion. The emulsion is stabilized by subjecting it to homogenization. The pellets are produced by first reducing the water content of the stabilized emulsion so that the film-forming component forms a film around the oil droplets and encapsulates the encapsulant. In embodiments of the invention, the water content of the homogenized emulsion may be reduced by spray-drying to produce a powder. In other embodiments of the invention, after homogenization, the water content of the emulsion may be reduced by admixing the emulsion with at least one matrix material to thereby encapsulate the film-coated oil droplets within the matrix material. After the water content of the emulsion is reduced, a protective coating is applied on the film-coated oil droplets to obtain pellets.

64 Claims, No Drawings

U.S. PATENT DOCUMENTS

| | | | |
|---|---|---|---|
| 5,079,012 A | 1/1992 | van Lengerich et al. | |
| 5,087,461 A | 2/1992 | Levine et al. | |
| 5,106,639 A * | 4/1992 | Lee et al. | 426/302 |
| 5,118,513 A | 6/1992 | Mehansho et al. | |
| 5,183,690 A | 2/1993 | Carr et al. | 427/213.31 |
| 5,262,167 A | 11/1993 | Vegesna et al. | |
| 5,296,000 A | 3/1994 | Darmont et al. | 23/295 R |
| 5,314,692 A | 5/1994 | Haarasilta et al. | |
| 5,320,669 A | 6/1994 | Lim et al. | |
| 5,431,929 A | 7/1995 | Yatka et al. | |
| 5,458,823 A | 10/1995 | Perkins et al. | |
| 5,466,460 A | 11/1995 | McMahon et al. | |
| 5,508,053 A | 4/1996 | Villotta et al. | |
| 5,514,387 A | 5/1996 | Zimmerman et al. | |
| 5,567,730 A | 10/1996 | Miyashita et al. | 514/549 |
| 5,597,416 A | 1/1997 | Fuisz et al. | |
| 5,683,720 A | 11/1997 | Myers et al. | |
| 5,716,615 A | 2/1998 | Cavalier Vesely et al. | |
| 5,744,180 A | 4/1998 | Cherukuri et al. | |
| 5,750,104 A | 5/1998 | Sipos | |
| 5,820,903 A | 10/1998 | Fleury et al. | |
| 5,851,553 A | 12/1998 | Myers et al. | |
| 5,862,998 A | 1/1999 | Bogue et al. | |
| 5,894,029 A | 4/1999 | Brown et al. | |
| 5,902,617 A | 5/1999 | Pabst | |
| 5,939,127 A | 8/1999 | Abboud | |
| 5,952,033 A | 9/1999 | Anantharaman et al. | |
| 5,958,502 A | 9/1999 | Fulger et al. | |
| 5,972,373 A | 10/1999 | Yajima et al. | |
| 5,972,395 A | 10/1999 | Saleeb et al. | |
| 5,972,404 A | 10/1999 | van Lengerich | |
| 5,972,415 A | 10/1999 | Brassart et al. | |
| 5,976,603 A | 11/1999 | Kota et al. | |
| 6,004,594 A | 12/1999 | van Lengerich | |
| 6,008,027 A | 12/1999 | Langner | |
| 6,024,994 A | 2/2000 | Jacobson et al. | |
| 6,048,551 A | 4/2000 | Hilfinger et al. | |
| 6,149,965 A | 11/2000 | van Lengerich et al. | |
| 6,168,811 B1 | 1/2001 | Clark et al. | |
| 6,174,553 B1 | 1/2001 | Cerda et al. | |
| 6,190,591 B1 | 2/2001 | Van Lengerich | 264/141 |
| 6,242,033 B1 | 6/2001 | Sander | |
| 6,261,613 B1 | 7/2001 | Narayanaswamy et al. | |
| 6,284,268 B1 | 9/2001 | Mishra et al. | |
| 6,342,257 B1 | 1/2002 | Jacobson et al. | |
| 6,368,621 B1 | 4/2002 | Engel et al. | |
| 6,436,453 B1 | 8/2002 | van Lengerich et al. | |
| 6,468,568 B1 | 10/2002 | Leusner et al. | |
| 6,500,463 B1 | 12/2002 | van Lengerich | |
| 6,558,718 B1 | 5/2003 | Evenson et al. | |
| 6,720,001 B2 * | 4/2004 | Chen et al. | 424/455 |
| 6,723,358 B1 | 4/2004 | van Lengerich | |
| 6,837,682 B2 | 1/2005 | Evenson et al. | |
| 2001/0008635 A1 | 7/2001 | Quellet et al. | |

FOREIGN PATENT DOCUMENTS

| | | |
|---|---|---|
| DE | 40 21 678 A | 1/1992 |
| DE | 40 41 752 A1 | 6/1992 |
| EP | 0 336 662 A | 10/1969 |
| EP | 0 202 409 A2 | 11/1986 |
| EP | 0 223 963 A | 6/1987 |
| EP | 0 385 081 A2 | 9/1990 |
| EP | 0 391 518 A | 10/1990 |
| EP | 0462012 A2 | 12/1991 |
| EP | 0465364 A1 | 1/1992 |
| EP | 0 552 057 A | 7/1993 |
| EP | 0 603 992 A1 | 6/1994 |
| EP | 0 605 913 A | 7/1994 |
| EP | 0 705 541 A1 | 4/1996 |
| EP | 1 064 856 A2 | 1/2001 |
| EP | 1 066 761 A2 | 1/2001 |
| EP | 1 118 274 A | 7/2001 |
| FR | 2 640 472 A | 6/1990 |
| FR | 2 758 055 | 7/1998 |
| GB | 15312 | 3/1911 |
| GB | 1 437 501 A | 5/1976 |
| JP | 47014316 A | 10/1972 |
| JP | 59139317 A | 8/1984 |
| JP | 63 173568 | 7/1988 |
| JP | 1313421 | 12/1989 |
| JP | 6024962 A | 2/1994 |
| JP | 2000139372 A | 5/2000 |
| WO | WO 85/04074 A1 | 9/1985 |
| WO | WO 88/01512 A | 3/1988 |
| WO | WO 90/15537 | 12/1990 |
| WO | WO 91/03940 A1 | 4/1991 |
| WO | WO 92/00130 A1 | 1/1992 |
| WO | WO 92/00140 A1 | 1/1992 |
| WO | WO 92/12645 A1 | 8/1992 |
| WO | 94/01001 | 1/1994 |
| WO | WO 94/01001 | 1/1994 |
| WO | WO 94/23593 A1 | 10/1994 |
| WO | WO 95/00121 A1 | 1/1995 |
| WO | WO 95/18544 A1 | 7/1995 |
| WO | WO 95/26752 A1 | 10/1995 |
| WO | WO 96/09773 A1 | 4/1996 |
| WO | WO 96/14058 A1 | 5/1996 |
| WO | WO 97/16076 A1 | 5/1997 |
| WO | WO 97/38016 A | 10/1997 |
| WO | WO 97/39116 A1 | 10/1997 |
| WO | WO 98/02148 A | 1/1998 |
| WO | WO 98/09981 A | 3/1998 |
| WO | WO 98/18610 A1 | 5/1998 |
| WO | WO 98/35704 A | 8/1998 |
| WO | WO 98/50019 A | 11/1998 |
| WO | WO 98/54980 A2 | 12/1998 |
| WO | WO 98/58642 A | 12/1998 |
| WO | WO 99/11242 A1 | 3/1999 |
| WO | WO 99/20745 A1 | 4/1999 |
| WO | WO 99/23896 A1 | 5/1999 |
| WO | WO 99/34688 A1 | 7/1999 |
| WO | WO 99/45904 A1 | 9/1999 |
| WO | WO 99/48372 A1 | 9/1999 |
| WO | WO 99/56563 A2 | 11/1999 |
| WO | WO 99/61002 A1 | 12/1999 |
| WO | WO 99/65336 A1 | 12/1999 |
| WO | WO 00/21504 A1 | 4/2000 |
| WO | WO 00/41740 A2 | 7/2000 |
| WO | WO 00/64436 A1 | 11/2000 |
| WO | WO 01/25414 A1 | 4/2001 |
| WO | 01/74175 A1 | 10/2001 |
| WO | WO 01/74175 A1 | 10/2001 |

OTHER PUBLICATIONS

P. Colonna, et al., "Extrusion Cooking of Starch & Starch Products," Extrusion Cooking, C. Mercier, et al., pp. 247-319, AACC. St. Paul, MN (1989).

F. Mueser, at al., "A Systems Analtical Approach to Extrusion," Food Extrusion Science & Technology, ed. J. Kokini, Dekker Publ., pp. 619-630 (1992).

Per Artusson et al., "Characterization of Polyacryl Starch Microparticles as Carriers for Proteins and Drugs," *Journal of Pharmaceutical Science*, vol. 73, No. 11, pp. 1507-1513 (Nov. 1984).

Lennart Randen et al., "Coprecipitation of Enzymes with Water Soluble Starch—An Alternative to Freeze-drying," *J. Pharm. Pharmacol.*, vol. 40, pp. 763-766 (1988).

Shigeaki Maruo et al., "Effects of Moranoline, 4-O-α-D-Glucopyranosylmoranoline and Their N-Substituted Derivatives on Thermostability of Cyclodextrin Glycosyltransferase, Glucoamylase, and β-Amylase," *Biosci. Biotech. Biochem.*, vol. 57, No. 8, pp. 1294-1298 (1993).

Wendell Q. Sun et al., "Protein stability in the amophous carbohydrate matrix: relevance to anhydrobiosis," *Biochimica et Biophysica Acta*, vol. 1425, pp. 245-254 (1998).

Brochure entitled "Innovate With Raftiline®," Orafti Active Food Ingredients, Nov. 1996.

"Inulin-A 'Good-for-you' Fat Replacer, Texture Modifier," *Food Formulating*, p. 15, Feb. 1997.

Brighenti, F., et al., "One Month Consumption of Ready-to-eat Breakfast Cereal Containing Inulin Markedly Lowers Sersum Lipids in Normolipidemic Men," from: Proceedings of 7th FENS European Nutrition Conference, Vienna, 1995.

Silva, R., "Use of Inulin as a Natural Texture Modifier," *Cereal Foods World*, Oct. 1996, vol. 41, No. 10, pp. 792-794.

Niness, "Breakfast Foods and the Health Benefits Of Inulin and Oligofructose," *Cereal Foods World*, vol. 44, No. 2, Feb. 1999, pp. 79-81.

*Webster's New Collegiate Dictionary*, 1976 ed., pp. 408 ("extrude"), 511 ("gum"), 716 ("melt"), 741 ("molten") and 1095 ("slurry").

U.S. Appl. No. 09/233,443, filed Jan. 20, 1999, van Lengerich.

U.S. Appl. No. 11/263,360, filed Oct. 31, 2005, van Lengerich et al.

Hermann, "Specialty Dairy Ingredients", Food Product Design, Feb. 1992.

* cited by examiner

ENCAPSULATION OF SENSITIVE COMPONENTS USING PRE-EMULSIFICATION

FIELD OF THE INVENTION

The present invention relates to a continuous process for producing shelf-stable, discrete, solid particles which contain an encapsulated and/or embedded component such as a heat sensitive or readily oxidizable pharmaceutically, biologically, or nutritionally active component, such as omega-3 fatty acids.

BACKGROUND OF THE INVENTION

In encapsulating a component in a matrix, the matrix material is generally heated to a sufficiently high temperature to provide a plasticized mass which facilitates embedding or coating of the component. Upon cooling, the matrix material hardens or becomes solidified and protects the encapsulant from undesirable or premature reaction. Grinding of a solidified or glassy product to obtain a desired particle size for incorporation in foods or beverages generally results in the formation of irregularly-shaped pieces and rough surfaces. Irregularly shaped pieces and creviced surfaces tend to result in non-uniform encapsulant release, increased diffusion of liquid encapsulants, and increased penetration of oxygen and water which may deleteriously affect sensitive encapsulants, such as readily oxidizable components.

Additionally, heating of the matrix to plasticize it or to form a melt may deleteriously affect or decompose the encapsulant as well as the matrix material. The mixing or high shear used to disperse the encapsulant uniformly throughout the plasticized matrix material may likewise adversely affect the matrix material or encapsulant. Furthermore, the use of high temperatures to plasticize or melt the matrix material may cause evaporation and loss of the encapsulant. The addition of liquids to the matrix material to reduce its viscosity and to facilitate mixing may require excessive drying or evaporation of the plasticizing liquid for the attainment of a formable composition capable of being formed into discrete, substantially uniform, smooth-surfaced pieces. Furthermore, removal of the plasticizing liquid may adversely expand the product, decrease its density, and make the encapsulated component more susceptible to attack or more easily released. These problems involved with the removal of liquid may be even more pronounced when the commercially available form of the encapsulant is dissolved or dispersed in a liquid, such as omega-3 fatty acids which are contained in fish oil.

Prophylactic and therapeutic benefits of omega-3 fatty acids and their role as anti-inflammatory agents are well-proven. Recent clinical studies have further suggested that consumption of sufficient amounts of these fatty acids may be adequate for intervention treatment for animals and humans suffering from rheumatoid arthritis. Dietary sources of omega-3 fatty acids can be found mainly in foods from marine sources such as algae and fish. In most populations, however, the nutritional benefits of polyunsaturated fatty acid (PUFA) compounds cannot be realized due to the low consumption of fish and edible algae. With the U.S. Food and Drug Administration's current allowance for health claims relating intake of omega-3 fatty acids to protection from heart disease, there is an increased interest in fortifying food products with these components. One main problem that hinders the incorporation of omega-3 PUFA oils into processed foods is the oil's high degree of unsaturation, its susceptibility to oxidation and the subsequent deteriorative effects on flavor and aroma of the oil.

The stabilization of omega-3 fatty acid compounds is disclosed in U.S. Pat. No. 5,567,730 to Miyashita et al. One or more of the compounds or an oil or fat containing the compounds is dispersed in an aqueous solution optionally using a surface active agent or an emulsifying agent, such as Tween 20, a sucrose fatty ester, a sorbitan fatty ester, lecithin and a monoglyceride. A water soluble or oil soluble anti-oxidizing agent or a clathrate inclusion compound such as cyclodextrin can be used together with the surface active agent or emulsifying agent. When no surface active agent or emulsifying agent is used, the amount of the omega-3 fatty acid to added to the aqueous system to allow the stabilization is 0.0001-0.3 (w/v)%. When the agent is employed the amount of the omega-3 fatty acid to be added to the aqueous system to allow the stabilization is still only 0.0001-7 (w/v)%. Production of shelf-stable, discrete, solid particles which contain omega-3 fatty acids or fish oils is not disclosed.

International patent publication no. WO 95/26752 (published Oct. 12, 1995) discloses the production of a food product for the enteric supply of a fatty acid, a fatty acid containing substance, an amino acid, or an amino acid containing substance by at least partially complexing the fatty acid or amino acid in the amylose helix of starch to mask the acid. The product may contain one or more flavors and colors, fat soluble substances, anti-oxidants, or pharmacologically effective substances. The components may be first dry mixed and subsequently fed into an extruder where they are substantially mixed and subsequently heated above the gelatinization temperature of the starch to obtain an elasticized mass which is extruded and formed into pellets. However, heat-sensitive components would be destroyed during the heating step.

U.S. Pat. No. 4,895,725 to Kantor et al discloses the microencapsulation of oil-based bioactive materials, such as fish oil which contain polyunsaturated fatty acids. The microcapsules are prepared from an emulsion of fish oil and an enteric coating suspended in a basic solutution, preferably a 25% suspension of ethyl cellulose in ammonium hydroxide. The emulsion is atomized into an acidic solution using an inert gas such as nitrogen or argon. The resulting microcapsules are filtered out of the acidic solution, washed with water and a surfactant and dried. The conditions under which the emulsion is atomized determines the particle size, which can range from about 0.1 to 500 microns, preferably betweeen about 0.5 to 100 microns. However, the enteric coating, such as ethylcellulose is not solubilized and the resulting suspension requires atomization into an acidic aqueous solution produce microcapsules. Filtering and several washing stops are needed to recover the microcapsules. Control of oil droplet sizes by homogenization so as to avoid coalescence and obtain a substantially uniform oil droplet size is not disclosed. Protection or prevention of the microcapsules from cracking, or rupturing is not taught. Also, prevention or inhibition of diffusion of the oil through the capsule wall to the microcapsule surface, and penetration of oxygen through the capsule wall into the oil are not disclosed.

The production of expanded products is disclosed in European patent publication nos. EP 0465364 A1 (published Jan. 8, 1992) and EP 0462012 A2 (published Dec. 18, 1991), U.S. Pat. No. 3,962,416 to Katzen and U.S. Pat. No. 3,786,123 to Katzen. The two European patent publications disclose the production of an anti-obesity food and a method for making it by extrusion of starches with fatty acids into an expanded product having densities between 0.1 and 0.3 g/cm$^3$. U.S. Pat.

No. 3,962,416 to Katzen discloses an expanded product which contains at least one nutrient and one gelatinized starch.

U.S. Pat. No. 3,786,123 to Katzen discloses a method for producing encapsulated nutrients using extrusion temperatures of between 250° F. and 400° F. and extrusion pressures of between 200 psi to 2500 psi. A high protein encapsulating agent containing up to 40% starch may be used. The starch is gelatinized and extruded into an expanded product.

However, in producing a product having controlled release or delayed release, excessive expansion or puffing may result in too rapid release properties or may undesirably expose an encapsulant to destructive reactions. For example, an edible composition for delivering encapsulated pharmaceutically or nutritionally active components or for a non-edible agricultural product for delivering biocides or herbicides, it is desirable that the products have a substantially spherical shape and a high density. Such products exhibit a substantially low ratio between surface area and volume and thus minimize or prevent surface related destructive reactions that occur upon exposure to air or oxygen and light. The spherical shapes and high densities also minimize the surface which would be available to expose embedded material which is not encapsulated. Furthermore, for edible products for delivering pharmaceutically or nutritionally active components, it is desirable that the products are capable of being consumed or swallowed without chewing or substantially no chewing. Avoiding the need for mastication, further assures that the products reach the digestive tract without substantial enzymatic hydrolysis in the mouth. Furthermore, it helps to control or reduce dissolution of the product in gastric juice and to control the release of the embedded or encapsulated components in the stomach and/or in the intestine.

International patent publication no. WO 92/00130 (published Jan. 9, 1992) discloses a continuous process for obtaining an encapsulated, biologically active product in a starchy matrix. A biologically active agent and starch are mixed before extrusion and extruded as a blend, with the encapsulant or biologically active agent being heated together with the starch. Alternatively, a core material to be encapsulated may be added and blended with an aqueous dispersion of starch after the starch and water have been subjected to an elevated temperature sufficient to gelatinize the starch. The extrusion process, it is disclosed, exposes the mix to high shear mechanical action at a temperature above the gelatinization temperature of the starch. The use of extrusion barrel temperatures of between about 58° C. and 98° C. are disclosed. While these barrel temperatures may be above the gelatinization temperature of starch, the extruder utilized has barrel sections that are only three l/d long. The screw speeds utilized, between 400 rpm and 200 rpm, result in a very short residence time of the blend inside the extruder and barely allow heating up of the starch water mix. As a result, the temperatures obtained are generally too low to obtain substantial gelatinization of native starches. Additionally, the barrel temperatures used are particularly too low for substantial gelatinization of high amylose starch which generally gelatinizes at temperatures substantially above 100° C., for example at 125° C. The use of extrusion barrel temperatures which are not sufficiently high to substantially or completely gelatinize the starch may not form a sufficiently continuous, plasticized and homogeneous matrix for effective embedding or encapsulation.

In addition, the use of relatively low extrusion temperatures, high speed mixing, and a high viscosity starch composition generally requires a high mechanical energy input. High shear is directly related to high specific mechanical energy, which in turn increases the molecular destructurization and dextrinization of starch. Breakdown of the starch molecules, and in particular the amylopectin, increases the solubility of the extruded starch composition in aqueous systems as described in P. Colonna, et al., "Extrusion Cooking of Starch & Starchy Products," *Extrusion Cooking*, C. Mercier, et al. pp. 247-319, AACC, St. Paul, Minn. (1989) and F. Meuser, et al, "A Systems Analytical Approach To Extrusion," *Food Extrusion Science & Technology*, ed. J. Kokini, Dekker Publ., pp. 619-630 (1992). Increased solubility of the extruded starch in aqueous systems decreases the stability of the product against moisture and subsequently diminishes or shortens the protection and controlled release of the embedded or encapsulated substances. In addition, subjecting the encapsulant to the same high shear and high temperature conditions to which the starch is subjected may adversely affect the encapsulant by at least partially destroying it or decomposing it into unknown solid or volatile substances.

Pregelatinized starch is used in numerous applications in the food industry as a swelling agent and for accelerated and extended water absorption in foods such as soups, sauces, instant puddings, baby food, and thickening agents. However, it has been found that the use of pregelatinized starch or the use of starch as the only matrix material during extrusion cooking generally results in a matrix which releases the encapsulant too quickly. It has been found that the penetration of water into a pure starch matrix causes early release of the encapsulant into the environment. Generally the time to release 100% of the encapsulant is too short to provide a desirable time-release or controlled-release which is effective for delivering the encapsulant at a desired location or time.

U.S. Pat. No. 5,183,690 to Carr, et al. discloses a continuous process for imparting predetermined release properties to an encapsulated biologically active agent in a matrix of starchy material. The starchy material, an active agent, and water are continuously blended in an ingredient stream wherein the starchy material is at a solids concentration of at least 40%. The ingredients stream is continuously extruded as an extrudate and the extrudate is continuously recovered. The conditions of blending, extruding, and recovering are preselected to yield the predetermined release properties. The temperature is elevated to at least about 65° C. to effect gelatinization of starch and assure an essentially molecular dispersion of the starch in the water. Alternatively, the core material to be encapsulated is added and blended with the aqueous dispersion of starch after the starch and water has been subjected to an elevated temperature sufficient to gelatinize the starch. In this embodiment the aqueous starch stream containing gelatinized starch may be lowered to a temperature as low as about 25° C. before the core material to be encapsulated is added and subjected to high-shear mechanical action. Under such low temperature conditions of admixture it is disclosed, the activity of sensitive biological material, such as bacteria and viruses, is preserved and loss of volatile organic materials is minimized. The rate of swelling of the products in water and the rate of release of active agents are controlled by altering the amount of water present in the starch-agent-water blend during processing. As the amount of water is decreased, both the swelling rate and the release rate increase. The rate of swelling of the products in water and the rate of release of active agent are also controlled by passage of the extrudate containing starch-agent-water through an exit die of various dimensions. As the exit die is reduced in size, both the rate and extent of swelling increase and the rate of release of agent increases.

U.S. Pat. No. 6,190,591 and International Publication No. WO 98/18610, published on May 7, 1998, both to Bernhard H. van Lengerich, the disclosures of which are herein incorporated by reference in their entireties, disclose a controlled release particulate composition which contains a hydrophobic component for controlling the release of an encapsulated and/or embedded active component from a plasticized matrix. High water binding capacity agents may also be used to delay or control the release of the encapsulant from the matrix. A high amount of plasticizer is employed to facilitate plasticization of the matrix material at low shear and is then reduced prior to adding the encapsulant to facilitate subsequent forming and to reduce post extrusion drying. Liquid active components or solutions, dispersions, emulsions or suspensions may be injected into the plasticized matrix material. The controlled release or delayed release composition may be produced without substantial expansion of the matrix material to thereby avoid production of a low density product which prematurely or too rapidly releases the encapsulant or the embedded component.

Copending U.S. application Ser. No. 09/233,443, filed Jan. 20, 1999 in the name of Bernhard H. Van Lengerich, International Publication No. WO 00/21504 published on Apr. 20, 2000, copending U.S. application Ser. No. 09/410,017, filed Oct. 1, 1999 in the name of Bernhard H. Van Lengerich, and International Publication No. WO 01/25414 published on Apr. 12, 2001, the disclosures of which are herein incorporated by reference in their entireties, disclose a continuous process for producing shelf-stable, controlled release, discrete, solid particles from a liquid encapsulant component which contains a sensitive encapsulant, such as a heat sensitive or readily oxidizable pharmaceutically, biologically, or nutritionally active component, such as essential and/or highly unsaturated fatty acids. A liquid encapsulant component which contains an active, sensitive encapsulant, such as a live microorganism or an enzyme dissolved or dispersed in a liquid plasticizer is admixed with a plasticizable matrix material. The matrix material is plasticizable by the liquid plasticizer and the encapsulation of the active encapsulant is accomplished at a low temperature and under low shear conditions. The active component is encapsulated and/or embedded in the plasticizable matrix component or material in a continuous process to produce discrete, solid particles. The encapsulants may be suspensions of microorganisms in water, and suspensions or dispersions or emulsions or solutions of vitamins, enzymes, minerals or trace elements in water or other liquids. The liquid content of the liquid encapsulant component provides substantially all or completely all of the liquid plasticizer needed to plasticize the matrix component to obtain a formable, extrudable, cuttable, mixture or dough. Removal of liquid plasticizer prior to extrusion is not needed to adjust the viscosity of the mixture for formability.

The present invention provides a process for producing discrete, particulate, shelf-stable encapsulated sensitive components, such as heat-sensitive components or readily oxidizable components, such as omega-3 fatty acids using emulsification which avoids oil droplet coalescence, provides increased bioavailability of the component. The process prevents exposure of the sensitive components to the atmosphere due to outward migration of the oil component to the particulate surface and inward penetration of atmospheric oxygen to the encapsulant. The process achieves substantially uniformly shaped and substantially uniformly sized particulates having substantially smooth, non-cracked or non-creviced surfaces. The particulates may be produced at low temperatures without substantial heating or without substantial gelatinization of starch to avoid thermal destruction of the sensitive components, and to avoid substantial expansion. An extrudable, formable, cuttable, mixture or dough may be obtained continuously without the need for removing or evaporating liquid plasticizer prior to extrusion or forming. The processes of the present invention may be used for the continuous production of an edible composition for delivering pharmaceutically or nutritionally active components, such as omega-3 fatty acids. The particulates containing encapsulated fish oils, and food products containing the particulates do not exhibit rancid odors or tastes for extended periods of time, for example for at least about six months.

SUMMARY OF THE INVENTION

The present invention provides a continuous process for producing controlled release, discrete, solid particles or pellets which contain an encapsulated and/or embedded component, such as a readily oxidizable component or a heat sensitive component. An oil component which comprises an encapsulant is admixed with an aqueous component, and a film-forming component to form an emulsion. The oil component may be an oil with an oil-soluble encapsulant dissolved in the oil. In other embodiments, the oil component may be an oil with a solid encapsulant dispersed in the oil.

The emulsion is subjected to homogenization to obtain an oil-in-water emulsion comprising oil droplets wherein the oil droplets comprise the encapsulant and have a diameter of less than about 50 microns, preferably less than about 10 microns, most preferably less than about 2 microns. The attainment of small oil droplet diameters and a substantially uniform size distribution increases stability of the oil-in-water emulsion, helps to avoid oil droplet coalescence, and provides increased bioavailability and uniform or more consistent release of the encapsulant from the particulates.

The film-forming component is present in the aqueous phase and surrounds the oil droplets, and is desirably concentrated at the oil and water interface. In preferred embodiments of the invention, the film-forming component is water soluble and comprises a hydrophobic or oleophilic portion, such as a film-forming protein, so that it concentrates in the aqueous phase at the interface. Preferred proteins which may be used in the emulsification as the film-forming component are whey protein isolates and gluten. The protein may be at least substantially or completely hydrated and denatured prior to admixing with the oil component to avoid clumping and to facilitate subsequent pumping through the homogenizer. The film-forming component helps to stabilize the emulsion, retain oil droplet size, inhibit diffusion of the oil component and encapsulant to the particulate or pellet surface, and to inhibit contact of rancidity-causing oxygen with the oil component. In preferred embodiments, a film-softening component or plasticizer for reducing brittleness and preventing cracking of the film formed from the film-forming component may be added in the emulsion step. For the encapsulation of readily oxidizable components such as omega-3 fatty acids, an antioxidant is preferably added in the emulsion step and the emulsion is preferably prepared in an atmosphere substantially free of oxygen.

After homogenization, the water content of the emulsion is reduced so that the film-forming component forms a film around the oil droplets and encapsulates the encapsulant. After the water content of the emulsion is reduced, a protective coating is applied on the film-coated oil droplets to obtain pellets and to prevent diffusion of the oil component to the surface of the pellets, and to inhibit penetration of atmospheric oxygen into the encapsulated oil component. The protective coating also fills in or seals any crevices, cracks, irregularities, or pores in the underlying substrate and helps to provide a more smooth surfaced, uniform pellet or cluster.

The protective coating may be hydrophilic or oleophobic so as to inhibit outward migration of the oil component to the surface of the pellet where it would be subject to oxidation. A protective coating composition which may be applied is an alcoholic solution of zein or a melted chocolate fat.

In embodiments of the invention, the water content of the emulsion may be reduced by spray-drying to produce a powder. The spray-drying may be conducted into atmospheric air or into an atmosphere substantially free of oxygen, such as a nitrogen atmosphere or inert gas atmosphere. The powder obtained by spray drying may then be coated or enrobed with the protective coating to obtain pellets or clusters. Spray drying generally produces powders having a lava rock or pocked surface appearance. Application of the protective coating fills in the voids and imparts a smooth, more regular, less porous surface, or reduced surface area, which is less susceptible to penetration by oxygen. Also, the coated pieces or pellets are readily dispersible, more discrete, more flowable and more readily swallowed than the uncoated powder.

In other embodiments of the invention, after homogenization, the water content of the emulsion may be reduced by admixing the emulsion with a matrix material to thereby encapsulate the film-coated oil droplets within the matrix material. The aqueous component is adsorbed by or interacts with the matrix material to thereby increase the concentration of the film-forming component and to cause it to form a film and precipitate around the oil droplets. Preferably, the matrix material comprises a plasticizable matrix material, such as durum wheat flour, which is plasticized by the aqueous component to thereby encapsulate the film-coated oil droplets within the plasticized matrix material. Admixing of the emulsion and the matrix material may be performed in an extruder to form a dough. The dough is extruded through a die to obtain an extrudate, the extrudate is cut into pieces, and the pieces are surface dried to further promote film formation and to reduce stickiness of the pieces, and to facilitate the subsequent application of a protective coating on the pieces. The surface drying may be performed in air, preferably hot and dehumidified air. An atmosphere which is at least substantially free of oxygen, such as a nitrogen or inert gas atmosphere is preferably employed for drying of pieces containing a readily oxidizable component such as omega-3 fatty acids. After drying of the pieces, the protective coating may be applied to the pieces to obtain pellets.

After application of the protective coating, the pellets may be dried to obtain the final encapsulated product. The dried pellets, or final product, may have a moisture content of from about 2% by weight to about 15% by weight, and an oil content of from about 1% by weight to about 45% by weight, based upon the weight of the dried pellets.

DETAILED DESCRIPTION OF THE INVENTION

A stabilized emulsion is employed to produce shelf stable, controlled release, discrete, solid particles or pellets which contain an encapsulated and/or embedded component, such as a readily oxidizable component or a heat sensitive component. An oil encapsulant component which contains an active, sensitive encapsulant dissolved and/or dispersed in an oil is admixed with an aqueous component and a film-forming component to form an emulsion. An antioxidant for prevention of oxidation of the active, sensitive encapsulant, and a film-softening component or plasticizer for the film-forming component may be included in the emulsion. The emulsion is stabilized by subjecting it to homogenization.

The pellets are produced by first reducing the water content of the stabilized emulsion so that the film-forming component forms a film around the oil droplets and encapsulates the encapsulant. In embodiments of the invention, the water content of the homogenized emulsion may be reduced by spray-drying to produce a powder. In other embodiments of the invention, after homogenization, the water content of the emulsion may be reduced by admixing the emulsion with at least one matrix material to thereby encapsulate the film-coated oil droplets within the matrix material.

After the water content of the emulsion is reduced, a protective coating is applied on the film-coated oil droplets to obtain pellets. The protective coating helps to prevent diffusion of the oil component to the surface of the pellets, and helps to inhibit penetration of atmospheric oxygen into the encapsulated oil component. The protective coating also fills in or seals any crevices, cracks, irregularities, or pores in the underlying substrate and helps to provide a more smooth surfaced, uniform pellet or cluster. After application of the protective coating, the pellets may be dried to obtain the final encapsulated product.

The present invention provides an encapsulated product comprising pellets, where each pellet has a protective coating which surrounds a plurality of oil droplets. The oil droplets are encapsulated in a film-forming component, preferably a film-forming water-soluble protein. The oil droplets may contain a dissolved or dispersed or suspended active component. For example, the oil droplets may be a fish oil containing omega-3 fatty acids. In other embodiments, the film-encapsulated oil droplets, such as the protein-encapsulated fish oil droplets, are encapsulated in a plasticized matrix material, and the plasticized matrix material is coated by the protective coating.

Preparation of the Stabilized Oil-in-Water Emulsion

Improved dispersion and encapsulation of active, sensitive encapsulant materials in discrete shelf-stable particles is obtained by pre-emulsification of the encapsulant. The encapsulant is incorporated into or forms the oil phase of an oil-in-water emulsion. The oil-in-water emulsion containing the encapsulant may, for example, be spray dried or admixed with at least one matrix material, such as a plasticizable matrix material, to encapsulate the encapsulant within the matrix material. In the latter embodiment, matrix materials which are plasticizable by the emulsion or the aqueous component of the emulsion, results in encapsulation of the encapsulant within a plasticized matrix material. The encapsulant or sensitive, active component may be a solid or liquid. Solid encapsulants are dispersed in an oil prior to emulsification with water or an aqueous liquid. If the encapsulant itself is an oil, it may be directly emulsified with the water or aqueous liquid.

In embodiments of the present invention, the aqueous component, such as water or an acidic aqueous solution, such as a 0.2N acetic acid in water, may be admixed with the film-forming component, such as a protein, to obtain an aqueous solution. The film-forming component helps to stabilize the emulsion, retain oil droplet size, inhibit diffusion of the oil component and encapsulant to the particulate or pellet surface, and to inhibit contact of rancidity-causing oxygen with the oil component.

The aqueous solution, such as an aqueous protein solution, may have a film-forming component content, or protein content, of from about 1% by weight to about 50% by weight, preferably from about 5% by weight to about 45% by weight, most preferably from about 5% by weight to about 25% by weight, based upon the total weight of the aqueous component, such as water, and the film-forming component, such as protein.

In preferred embodiments of the invention, the film-forming component is water soluble and comprises a hydrophobic or oleophilic portion, such as a film-forming protein, so that it concentrates in the aqueous phase at the oil and water interface. Film-forming components which may be employed include proteins, hydrocolloids such as alginates and carrageenans, starch derivatives, and mixtures thereof. Proteins are the preferred film-forming components for use in the emulsification. Exemplary proteins which may be employed are vegetable or animal proteins or protein concentrates, such as proteins stemming from whey, corn, wheat, soy, or other vegetable or animal sources. Preferred proteins for use in the present invention are whey protein isolates and wheat protein isolates, such as gluten.

The protein may be at least substantially or completely hydrated and denatured prior to admixing with the oil component to avoid clumping and to facilitate subsequent pumping through the homogenizer. Hydration can be accomplished by preparing the solution the day before use and storing it under refrigerated conditions overnight to permit any foam or froth resulting from the mixing to settle.

The protein, such as whey protein isolate (WPI), can be kept in either the native form or can be denatured prior to emulsification with the fish oil. Denaturation can be achieved by heating the dispersed WPI solution to about 80° C.-90° C. and holding for 30 minutes. Denatured WPI solutions appear to form better films than native WPI solutions and may add to the stability of the final encapsulated fish oil. In either case, the whey protein isolate can serve as an emulsifier in the final emulsion with fish oil. Again, it is desirable to allow the WPI solutions (native or denatured) to fully hydrate and cool under refrigerated conditions, for example at about 40° F., prior to use.

In embodiments of the present invention, the emulsion may be made by mixing several optional ingredients with the aqueous film-forming component solution, such as the aqueous protein solution, using a Rotosolver high shear mixer or other mixer with adequate shear. Such optional ingredients include a film-softening component or plasticizer, an antioxidant, and an emulsifier. When a readily oxidizable encapsulant such as omega-3 fatty acids is to be encapsulated, mixing of the optional ingredients with the emulsion is preferably conducted in an atmosphere which is at least substantially free of oxygen, such as under a nitrogen blanket or inert gas blanket. Preferably to prevent and/or minimize oxygen exposure, a nitrogen blanket can be applied in subsequent locations when the fish oil is directly exposed to the atmosphere.

In preferred embodiments, a film-softening component or plasticizer for reducing brittleness and preventing cracking of the film formed from the film-forming component may be added in the emulsion step. Exemplary film-softening components which may be added to the emulsion are monosaccharides and disaccharides, such as sucrose and fructose, and polyols such as glycerol, and polyethylene glycol. The amount of the film-softening component or plasticizer may be from about 1% by weight to about 75% by weight, preferably from about 15% by weight to about 50% by weight, based upon the weight of said film-forming component.

For the encapsulation of readily oxidizable components such as omega-3 fatty acids, an antioxidant is preferably added in the emulsion step and the emulsion is preferably prepared in an atmosphere substantially free of oxygen, such as a nitrogen blanket. Exemplary anti-oxidants which may be employed are L-cysteine, ascorbic acid, erythobic acid, tocopherol, catechin, and mixtures thereof. The amount of the antioxidant employed may range from about 10 ppm by weight to about 10,000 ppm by weight, preferably from about 50 ppm by weight to about 1,000 ppm by weight, most preferably about 100 ppm by weight, based upon the weight of the oil component Once all of the ingredients for making the emulsion are admixed, the resulting emulsion may be run through a homogenizer. The homogenizer total stage pressure may be from about 1 psig to about 30,000 psig, generally at least about 2,000 psig, preferably from about 2,500 psig to about 10,000 psig, for example from about 3,000 psig to about 8,000 psig. The homogenization may be performed in one or more stages, using one or more passes through each stage. For example, two stages and three passes may be employed for the homogenization step. This process can produce a stable emulsion with droplet sizes less than about 2.1 microns (90 percentile). It is preferable to minimize heat exposure during homogenization as much as possible and to keep a nitrogen blanket on all emulsion containers.

Pre-emulsifying of an encapsulant oil or an encapsulant-in-oil into water or an aqueous liquid plasticizer may be achieved using a multi-step high pressure homogenizer either alone or in combination with a colloid mill to obtain minimum droplet size. High pressure homogenization gives rise to small droplet sizes and may substantially improve the distribution and dispersion, and bioavailability of active, sensitive encapsulants within a matrix material. Encapsulation of the emulsion within a matrix material can then be carried out under controlled, low pressure and low temperature conditions to prevent coalescence, oil separation, and extruder surging while giving a soft formable mixture or dough comprising small droplets of an active, sensitive encapsulant dispersed throughout the dough or mixture. The dough or mixture may be cut or shaped and dried to yield substantially non-expanded, discrete shelf-stable particles exhibiting an improved release profile of active encapsulant materials. An encapsulant may optionally be included in the water phase of the emulsion. An emulsifier may optionally be included to facilitate production or stabilization of the emulsion.

In high-pressure homogenization an oil encapsulant or encapsulant in-oil is mixed with water or an aqueous fluid to obtain small oil droplets. All, or at least substantially all, for example, at least about 90% of the oil droplets in the homogenized, stabilized emulsion and in the discrete particulates, pellets, or encapsulated products of the present invention may have oil droplet sizes of less than about 50 microns in diameter, preferably less than about 10 microns in diameter, preferably less than about 2 microns in diameter. In embodiments of the invention, the oil droplet diameters may be greater than about 0.5 mm. The smaller the droplets, the more stable is the emulsion which allows the formation of a dough without substantial coalescence of the droplets and oil separation. Also, reduced coalescence and very fine dispersion may increase bioavailability of the encapsulant. Reduction in coalescence increases coating or encapsulation of the encapsulant by a continuous phase of plasticized matrix material, for example plasticized semolina or mixtures of semolina and native starch. Use of a film-forming component, which can also function like an emulsifier, for example a vegetable or animal protein or protein concentrate can stabilize the emulsion by forming a thin film around the oil droplets during emulsification processing. Non-film forming emulsifiers, monoglycerides, diglycerides, or triglycerides or mixtures thereof, or other molecules that are characterized as having a lipophilic and a hydrophilic part may be employed to enhance stabilization of an oil encapsulant inside an outer aqueous phase. The smaller, substantially non-coalesced droplets, do not protrude from the matrix material, thereby reducing surface exposure of the oil coated encapsulant to air.

Encapsulants can either comprise an active oil component, or can comprise a solid active, sensitive encapsulant component dispersed in oil. Oil encapsulants may comprise, for example, castor oil, oil containing polyunsaturated fatty acids (PUFA) such as omega-3 fatty acids, such as eicosapentaenoic acid (EPA), docosahexaenoic acid (DHA), docosapentaenoic acid, and linolenic acid, omega-6 fatty acids, fat soluble vitamins such as vitamins A, D, E, and K, gamma linoleic acid, cod liver oil, flavorants, fragrances, active-ingredient containing extracts, e.g. chlorophyll or herbals, agricultural and pharmaceutical and other bioactive components soluble in oil, and mixtures thereof. Purified fish oils may, for example, have an omega-3 fatty acid content of about 30% by weight. Solid encapsulants may include solid forms of pharmaceutical compositions or compounds, nutraceutical compositions or compounds, nutritional components, biologically active components, flavorants or flavorant compositions, fragrances or fragrance compositions, detergents, pharmaceutically or nutritionally acceptable salts thereof and mixtures thereof.

Oil may serve to provide a protective coating on the encapsulant and may be used to control the rate of release of the encapsulant. Oil, including an encapsulant as oil, may be included in an amount of from about 1% by weight to about 49% by weight, preferably from about 20% by weight to about 49% by weight, most preferably from about 35% by weight to about 49.% by weight, based upon the weight of the emulsion, or total weight of the oil component and aqueous component. Edible oils, shortenings or fats which may be employed include those derived from plant, animal, and marine sources, as well as edible fat substitutes, and mixtures thereof. Exemplary of vegetable oils which may be employed are corn oil, safflower oil, soybean oil and cottonseed oil, which may be hydrogenated, and mixtures thereof.

The water-in-oil emulsions according to the present invention may optionally include an emulsifier to aid in the stabilization of the emulsion. Conventional emulsifiers used in food and pharmaceutical products may be selected for use according to the present invention.

Reduction of Water Content of the Emulsion by Admixing with a Matrix Material

After homogenization, the water content of the emulsion is reduced so that the film-forming component forms a film around the oil droplets and encapsulates the encapsulant. The water content of the emulsion may be reduced by admixing the emulsion with at least one matrix material to thereby encapsulate the film-coated oil droplets within the matrix material. The aqueous component, such as water, is adsorbed by or interacts with the matrix material to thereby increase the concentration of the film-forming component and to cause it to form a film and precipitate around the oil droplets. Thus, if microcapsules of the oil component and the film-forming component are obtained, the microcapsules are further encapsulated by the matrix component. Preferably, the matrix material comprises a plasticizable matrix material, such as durum wheat flour, which is plasticized by the aqueous component to thereby encapsulate the film-coated oil droplets within the plasticized matrix material. Admixing of the emulsion and the matrix material may be performed in an extruder to form a dough.

Plasticizers useful in the present invention include water, sorbitol, fruit juice and other aqueous liquids which enable the formation of a dough. In preferred embodiments, all or substantially all of the plasticizer may be the water or aqueous liquid contained in the oil-in-water emulsion encapsulant component. The formable mixture or dough of the present invention may have a total plasticizer content of up to about 60% by weight, preferably about 20% by weight to about 45% by weight of the product or dough of the present invention. When water or aqueous liquids are employed at high levels, for example a moisture content above about 60% by weight, a thin low viscosity dough may result which cannot be cut at a die. However, lower moisture contents, such as below about 5% may result in a dry product, which would be too fragile after forming and would fall apart. Low moisture contents may also generate frictional heating during extrusion forming and would be detrimental to a heat sensitive encapsulant.

In the method of admixing the water-in-oil encapsulant emulsion component into a plasticizable matrix material of the present invention, droplet size is inversely proportional to stability. Accordingly, desirable droplet sizes in the formable mixture or dough of the present invention may range from about 0.5 microns to about 50 microns in diameter, preferably less than about 10 microns in diameter, most preferably less than about 2 microns. As evidence of emulsion stability, the droplet diameters of the emulsion of the present invention remain substantially unchanged throughout the admixture of the emulsion with a matrix material to form a dough or formable mixture. This may result from the fact that the water or aqueous liquid that forms the continuous phase of the emulsion acts as a plasticizer for the plasticizable matrix material of the present invention and thereby becomes all or substantially all of the liquid in the continuous phase of a dough or formable mixture of the present invention.

According to the present invention, the plasticizable matrix material is plasticized by water or an aqueous liquid. The water or aqueous liquid of the emulsion of the present invention preferably comprises all or substantially all of the plasticizer for the plasticizable matrix material of the present invention.

The preferred plasticizable matrix materials of the present invention are high gluten content flours, gluten from wheat, durum wheat or semolina, pregelatinized starch, pentosans, hydrocolloids and mixtures thereof. For easier distribution or dispersibility in liquids such as water, finally ground or powdered cookies or crackers or ground cookie-like or cracker-like products may be employed as a matrix material. Other plasticizable matrix materials useful in accordance with the present invention include biopolymers such as carbohydrates, polymers such as polyvinylpyrrolidone, gums and vegetable or dairy proteins. Exemplary starches which may be used in the present invention are modified starches or pregelatinized starches derived from corn, wheat, rice, potato, tapioca, or high amylose starch. Sources of starch which may be used also include flours from grains such as corn, wheat, durum wheat, rice, barley, oat, or rye, and mixtures thereof. The most preferred plasticizable matrix materials according to the present invention include durum wheat flour, semolina, gluten, native starch and mixtures thereof. In embodiments of the present invention, the matrix material component may be at least about 30% by weight, for example about 60% by weight to about 95% by weight, based on the weight of the final product.

Durum products or ingredients which may be used in the present invention include durum semolina, durum granular, durum flour and mixtures thereof Durum semolina is preferred. Durum semolina is the purified or isolated middlings of durum wheat prepared by grinding and bolting cleaned durum wheat to such fineness that when tested by the method prescribed in 21 CFR § 137.300(b)(2), it all passes through a No. 20 U.S. sieve, but not more than 3 percent passes through a No. 100 U.S. sieve. The semolina is freed from bran coat or bran coat and germ to such an extent that the percent of ash therein, calculated to a moisture-free basis, is not more than 0.92 percent. The durum granular product is a semolina to which flour has been added so that about 7% passes through the No. 100 U.S. sieve. Durum flour has not less than 98 percent passing through the No. 70 U.S. sieve.

Substantially non-plasticizable matrix components may be used to increase the rate of release of encapsulants from the matrix. Such substantially non-plasticizable matrix materials may comprise substantially non-gelatinized starch in a preferred embodiment, as well as carbohydrates which have a lower molecular weight than starches, bulking agents, fiber or other, inert materials, such as cellulose, fiber or hemi-cellulose. Sources of starch which may be used include flours or starches from grains such as corn, wheat, durum wheat, rice, barley, oat, or rye, and mixtures thereof. In embodiments of the invention, the amount of matrix component which is substantially non-plasticizable is at least about 10% by weight, preferably at least about 25% by weight, and can range up to about 98% by weight, based on the total weight of the at least one plasticizable matrix material and the matrix component which is substantially non-plasticizable. For quickest release rates, the amount of substantially non-plasticizable matrix material, such as non-gelatinized starch, may be at least about 60% by weight, based upon the total weight of the matrix materials.

Additional rate release controlling agents may be added to the admixture of the present invention, including components that may manage, control or affect the flow, diffusion or distribution of water or aqueous-based compositions into and within the final product particles. The additional ingredient or component for controlling the rate of release of the encapsulant may be a hydrophobic agent such as polyethylene, polyurethane, polypropylene, polyvinylchloride, polyvinylacetate, a fat, oil, wax, fatty acid, or emulsifier which increases the hydrophobicity of the matrix. The increased hydrophobicity helps to prevent or delays penetration of water or gastric juice into the matrix. Other ingredients which may be used to control the rate of the release are components which have a high water binding capacity which delay or prevent a fast dissolving of the matrix and thereby delay the release of the encapsulant into the matrix. Exemplary of high water binding capacity components which may be used are proteins, such as wheat gluten, gelatin, and casein, hydrocolloid gums, and the like.

The admixing step of the present invention may be preferably carried out in an extruder to form an admixture of an oil-in-water encapsulant emulsion component, a plasticizable matrix material, a non-plasticizable matrix material and an optional rate release controlling agent. Low extrusion pressures and temperatures are employed to avoid coalescence, oil separation and extruder surging. Generally, to extrude at high pressures, high viscosities are needed to prevent coalescence. However, increasing the viscosity tends to increase shear which can destroy an emulsion.

Low extrusion pressures help to prevent coalescence, prevent the separation of an emulsion and prevent extruder surging. To achieve low pressures, dough viscosity may be reduced by increasing the amount of plasticizer, such as water. However, the dough viscosity should be sufficiently high so as to allow for the attainment of a formable, cuttable mixture at the die. Desirable extruder pressures under which the formable mixture may be formed may range from about 1 bar to about 150 bars, preferably from about 2 bars to about 100 bars, more preferably from about 5 bars to about 50 bars.

In making the formable mixture or dough of the present invention, it is preferable in the admixing method of the present invention to achieve a balance between shear, which reduces particle size on the one hand, and lower viscosity, which reduces shear on the other hand. Reducing particle size reduces coalescence and ensures protection of each individual encapsulant droplet within the particles according to the present invention.

In embodiments of the present invention, the pre-emulsified components may be injected into the upstream end of the extruder to achieve plasticization of the plasticizable matrix material without substantial coalescence, or oil separation or surging even at high oil contents. Mixing is continued towards the extruder die while optionally adjusting the product temperature for sufficient formability. The plasticizable matrix material is plasticizable and is plasticized by the water or aqueous liquid, but the substantially non-plasticizable matrix component is substantially non-plasticizable and is not plasticized by the liquid plasticizer generally at a temperature of less than about 60° C., preferably less than 50° C., most preferably less than about 45° C., for example at room temperature, and can be extrememely low, such as down to about 0° C. Removal of liquid plasticizer prior to extrusion is not needed to adjust the viscosity of the mixture for formability. A formable mixture is obtained without substantially gelatinizing or cooking the plasticizable matrix material or the substantially non-plasticizable matrix component. The plasticizable matrix material in the formable mixture may become glassy upon drying, even though it was not cooked or substantially gelatinized during plasticization to obtain the formable mixture.

The amount of the active component or encapsulant which may be encapsulated or embedded into the matrix may be from about 1% by weight to about 85% by weight, preferably from about 3% by weight to about 50% by weight, and most preferably from about 5% by weight to about 30% by weight, based on the total weight of the plasticizable matrix material of the formable mixture or dough of the present invention.

The admixture or dough is extruded through extrusion dies and cut or otherwise formed into pieces or pellets with no or substantially no expansion of the extrudate.

In embodiments of the invention, the dough may be extruded through circular die holes having a diameter ranging from 0.1 mm-5 mm (preferably 0.25 mm-2 mm, most preferably 0.5 mm-1 mm) and face cut to 0.1 mm-5 mm (preferably 0.25 mm-2 mm, most preferably 0.5 mm-1 mm). For example, pellet dimensions of ~0.5 mm (ID)×0.5 mm (length) may be produced. The dough is kept cold during extrusion, for example less than approximately 30° C. The matrix can be composed of one or several different ingredients, ranging from durum wheat flour, whey protein isolate, wheat protein (or protein from other animal or vegetable sources), starch, alginate, to other hydrocolloids, etc. that may provide added oxidation protection. The freshly extruded pellets can contain an oil load between about 1-35% by weight (preferably about 5-30% by weight, most preferably about 10-30% by weight), at moisture contents between approximately 15% to 50% by weight.

The extrudate or pieces may then be dried and then surface treated with a film-building substance, or protective coating such as a protein stemming from whey, corn, wheat, soy, or other vegetable or animal sources, a fat, shellac, wax, an enteric coating, and mixtures thereof to coat the extruded pellets or pieces to either prevent early release or to enable controlled release of the encapsulant from the pellets or pieces. The protective coating may be hydrophilic or oleophobic so as to inhibit outward migration of the oil component to the surface of the pellet where it would be subject to oxidation. Exemplary of protective coatings which may be employed are aquazein (an aqueous corn protein solution), denatured whey protein isolate solution (with or without a plasticizer), film-forming starch solutions, alginates, and melted chocolate fat. The film-building substance or protective coating may also contain additional components that delay or prevent the access of light, oxygen, and/or water to the matrix. Light barriers such as titanium dioxide, carbon black, edible ink, cocoa, or the like may be employed. In embodiments of the invention, the coating solution may be applied as a fine mist, atomized by nitrogen. Multiple coatings can be applied with intermediate drying in-between coatings.

In accordance with the present invention, the pellets can be surface dried after extrusion and before coating to facilitate application of a protective coating solution. For instance, drier pellets can accept higher levels of coating before clumping or agglomeration could become an issue. The pellets can be conveyed to a long (~2 ft ID×4 ft. long) rotating enrober with air blowing countercurrent to pellet flow. Dehumidified air is preferred for more efficient drying. Hot air (dehumidified or ambient) up to approximately 460° F. (~238° C.) can be used to surface dry the pellets to facilitate subsequent coating. Even at elevated hot air temperatures, the product temperature at the exit of the enrober can still remain below approximately 100° F. (~37.7° C.). In embodiments of the invention, up to about 10% by weight moisture or more, for example up to about 20% by weight, may be removed from the pellets.

Application of the protective coating may be achieved by pan coating the pieces to obtain pellets immediately after extrusion and prior to final drying. Multiple pan coatings can be applied with intermediate drying in-between coating layers. Fluid bed coating, coating with a rotating enrober drum can also be an option for coating the pieces to obtain pellets, though pan coating may prove more efficient and cost effective. In embodiments of the invention, the amount of coating may range from about 0.5% to about 50% by weight, based on weight of the total product, depending upon the desired release of the encapsulant.

The coated pellets may then be dried to their final moisture content. Convective drying by air, which may be dehumidified or ambiant, nitrogen, or carbon dioxide, may be employed. In embodiments of the invention, the final encapsulated fish oil can contain up to about 45% by weight oil, for example from about 1% by weight to about 40% by weight oil, at moisture contents of about 2% by weight to about 15% by weight, based upon the weight of the dried pellets. The pellets may be dried to achieve a storage stability or shelf life of at least about six months, preferably at least about twelve months, most preferably at least about thirty-six months.

Reduction of Water Content of the Emulsion by Spray Drying

In other embodiments of the invention, after homogenization, the water content of the emulsion may be reduced by spray drying to produce a powder. The spray-drying may be conducted into atmospheric air or into an atmosphere substantially free of oxygen, such as a nitrogen atmosphere or inert gas atmosphere. The powder obtained by spray drying may then be coated or enrobed with the protective coating to obtain pellets or clusters using protective coatings and coating techniques employed with the extrusion-produced pellets described above. Spray drying generally produces powders having a lava rock or pocked surface appearance. Application of the protective coating fills in the voids and imparts a smooth, more regular, less porous surface, or reduced surface area, which is less susceptible to penetration by oxygen. Also, the coated pieces or pellets are readily dispersible, more discrete, more flowable and more readily swallowed than the uncoated powder.

The products of the present invention may possess a substantially non-chewable texture, which is perceived as being glassy or fracturable, but is between the chewable texture of streusel or chewable vitamin pills, and the dense, hard glassy texture of uncooked pasta. The products of the present invention may be in the form of discrete particles, pellets, clusters, or tablets. They may be spherical in shape, curvilinear or lens-shaped, flat discs, oval shaped, or the like. The diameter of the particles may range up to about 7 mm, for example from about 0.3 mm to about 7 mm and the l/d ratio may be from about 0.1 to about 10. In embodiments of the invention, the diameter of the particles may be from about 0.15 mm to about 4 mm, preferably from about 0.20 mm to about 1.0 mm or about 200 microns to about 1000 microns. The length-to-diameter ratio (l/d) of the particles may be from about 0.1 to about 10, for example about 0.5 to about 2, preferably about 1. The particles are generally uniform in size, partially glassy, and granular to increase palatability to humans and animals in a substantially compact form that is easy to swallow with or without chewing. The products of the invention are non-expanded, generally not leavenable, and may exhibit a non-puffed, substantially non-cellular, and partially glassy structure. The starch component of the matrices may be substantially ungelatinized or partially gelatinized, and not substantially destructurized or dextrinized. Exemplary specific densities of the products of the present invention are between about 800 g/liter and about 1500 g/liter (about 0.8 to about 1.5 g/cm$^3$).

The encapsulated products of the present invention may be incorporated without grinding into foods intended for human or animal consumption such as baked goods, for example, bread, wafers, cookies, crackers, pretzels, pizza, and rolls, ready-to-eat breakfast cereals, hot cereals, pasta products, snacks such as fruit snacks, salty snacks, grain-based snacks, and microwave popcorn, dairy products such as yoghurt, cheese, and ice cream, sweet goods such as hard candy, soft candy, and chocolate, beverages, animal feed, pet foods such as dog food and cat food, aqua-culture foods such as fish food and shrimp feed, and special purpose foods such as baby food, infant formulas, hospital food, medical food, sports food, performance food or nutritional bars, or fortified foods, food preblends or mixes for home or food service use, such as preblends for soups or gravy, dessert mixes, dinner mixes, baking mixes such as bread mixes, and cake mixes, and baking flour.

In preferred embodiments, the active encapsulant is a fish oil containing omega-3 fatty acids. The encapsulated product may be redispersed as a liquid, or as a solid for human food, animal feed, or pharmaceutical purposes. The products of the present invention may be used as or incorporated into foods for special purposes, such as performance foods, mood foods, medical foods, nutritional snacks or supplements, sport foods such as power bars, baby foods, toddler foods, infant foods, or foods for pharmaceutical purposes or other dietetic purposes. The discrete particulates or granules of the present invention may be used as a topping for breakfast cereals, snacks, soups, salad, cakes, cookies, crackers, puddings, desserts or ice cream. They may also be used as a granular ingredient for yogurts, desserts, puddings, custards, ice cream or other pasty or creamy foods. Regularly sized pieces may be individually packaged or used as nutritional snacks or, for example added to or formed into nutritional food in bar form.

The present invention is further illustrated by the following non-limiting examples where all parts, percentages, proportions, and ratios are by weight, and all temperatures are in ° C. unless otherwise indicated:

EXAMPLE 1

"Native" Whey Protein Isolate Emulsion

About 9291.8 g of water and 1050 g of native whey protein isolate (WPI) may be admixed to form an aqueous solution comprising approximately 80.0 wt. % water and 9.5 wt. % WPI. The aqueous solution may then be hydrated overnight under refrigerated conditions at about 40° F.

In order to make an emulsion, about 0.7 grams of cysteine, 157.5 grams of glycerol and 7000 grams of omega-3 fish oil may be added to the aqueous solution under a nitrogen blanket and using a Rotosolver mixer at high sheer for about 5 minutes. The resulting emulsion may have a composition of about 53.4 wt. % water, 40 wt % fish oil, 5.7 wt. % WPI, 0.9 wt. % glycerol.

The emulsion may be homogenized in an APV homogenizer having a total stage pressure of approximately 8000 psi for three passes. During homogenation, a nitrogen blanket may be kept on all emulsion containers.

The homogenized emulsion may then serve as a liquid feed to an extruder that may be blanketed with nitrogen gas. The dry feed to the extruder may function as an encapsulating matrix for the emulsion and thus form a dough. The dry feed may contain 125 g/min. of durum wheat flour and optionally starch (e.g., rice), wheat protein, algenate, and additional WPI. The extruder may be a Buhler 44 twin screw extruder having a L/D ratio of 40 and 8 dies inserts having 0.5 mm inner diameter die holes. The dough may be extruded at a screw speed of approximately 80 rpm to form 0.5 mm long pellets. The pellets may comprise approximately 25.0 wt. % water, 13.8 wt. % fish oil, 2.0 wt. % WPI, 0.3 wt. % glycerol, and 58.9 wt. % of the durum wheat flour. A nitrogen blanket may be applied to the extruder feed.

The pellets may then be surface dried in a long (2 ft.×4 ft.) rotating enrober to evaporate about 14.2 g of moisture, thereby resulting in dried pellets containing about 19.0 wt. % water, 14.9 wt. % fish oil, 2.1 wt. % WPI, 0.3 wt. % glycerol, and 63.6 wt. % of the dry matrix.

The pellets may then be subjected to pan coating. The coating solution may be applied as a fine mist, atomized by nitrogen. The coating solution may contain 56.2 g of water and 24.1 g of purity gum starch. Multiple pan coatings may be applied with intermediate drying in between coating layers. The resulting coated pellet comprises about 26.0 wt. % water, 12.9 wt. % fish oil, 1.8 wt. % WPI, 0.3 wt. % glycerol, 54.8 wt. % matrix and 5.2 wt. % of the coating.

The coated pellets may then subjected to a final drying step to remove 111 g of additional water. The final composition contains about 8.5 wt. % water, 15.9 wt. % fish oil, 2.3 wt. % WPI, 0.4 wt. % glycerol, 67.8 wt. % matrix, and 5.1 wt. % of the coating.

EAXMPLE 2

"Denatured" WPI Emulsion

About 9291.8 g of water and 1050 g of WPI may be admixed to form an aqueous solution comprising approximately 80.0 wt. % water and 9.5 wt. % WPI. The aqueous solution may then be subjected to denaturing by heating the solution at a temperature of about 80-90° C. for about 30 minutes. The denatured solution may be hydrated overnight under refrigerated conditions at about 40° F.

In order to make an emulsion, about 0.7 grams of cysteine, 157.5 grams of glycerol and 7000 grams of omega-3 fish oil may be added to the aqueous solution under a nitrogen blanket and using a Rotosolver mixer at high sheer for about 5 minutes. The resulting emulsion may have a composition of about 53.4 wt. % water, 40 wt % fish oil, 5.7 wt. % WPI, 0.9 wt. % glycerol.

The emulsion may be homogenized in an APV homogenizer having a total stage pressure of approximately 8000 psi for three passes. During homogenization, a nitrogen blanket may be kept on all emulsion containers.

The homogenized emulsion may then serve as a liquid feed to an extruder that may be blanketed with nitrogen gas. The dry feed to the extruder may function as an encapsulating matrix for the emulsion and thus form a dough. The dry feed may contain 125 g/min. of durum wheat flour and optionally starch (e.g., rice), wheat protein, alginate, and additional WPI. The extruder may be a Buhler 44 twin screw extruder having a L/D ratio of 40 and 8 dies inserts having 0.5 mm inner diameter die holes. The dough may be extruded at a screw speed of approximately 80 rpm to form 0.5 mm long pellets. The pellets may comprise approximately 25.0 wt. % water, 13.8 wt. % fish oil, 2.0 wt. % WPI, 0.3 wt. % glycerol, and 58.9 wt. % of the durum wheat flour. A nitrogen blanket may be applied to the extruder feed.

The pellets may then be surface dried in a long rotating enrober to evaporate 25.4 g moisture, thereby resulting in dried pellets containing about 13.5 wt. % water, 15.9 wt. % fish oil, 2.3 wt. % WPI, 0.4 wt. % glycerol, and 67.9 wt. % of the dry matrix.

The pellets may then be subjected to pan coating. The coating solution may be applied as a fine mist, atomized by nitrogen. The coating solution may contain 108.2 g of water, 12.1 g denatured WPI, and 6.0 g sucrose. Multiple pan coatings may be applied with intermediate drying in between coating layers. The resulting coated pellet comprises about 28.1 wt. % water, 12.7 wt. % fish oil, 1.8 wt. % WPI, 0.3 wt. % glycerol, 54.2 wt. % matrix and 1.9 wt. % of the coating.

The coated pellets may then subjected to a final drying step to remove an additional 133.9 g water. The final composition contains about 8.5 wt. % water, 16.2 wt. % fish oil, 2.3 wt. % WPI, 0.4 wt. % glycerol, 69 wt. % matrix, 2.5 wt. % of the coating, and 1.2 wt. % other materials.

EXAMPLE 3

Wheat Protein Emulsion Extruded

About 8358.3 g of deionized water, 1491.5 g of wheat protein, 33.8 g of erythorbic acid, 50.7 g of acidic acid, 113.3 g of starch, and 567.8 grams of sucrose may be added to form a protein solution containing about 79.5 wt. % moisture, 13.3 wt. % whet protein, 5.3 wt. % plasticizer, 1.0 wt. % capsule matrix and 0.8 wt. % acid. The protein solution is subjected to hydration overnight under refrigerated conditions at about 40° F. The protein solution may then be subjected to a filtration through 100 mesh screen to remove undissolved protein clumps.

About 5422 g of omega-3 fish oil and 337.7 grams of Maillose may be added to the protein solution to make an emulsion. The emulsion may contain about 53.4 wt. % water, 33.1 wt. % fish oil, 8.7 wt. % wheat protein, 3.5 wt. % plasticizer, 0.7 wt. % capsule matrix, and 0.7 wt. % Maillose. The emulsion may then be subjected to homogenization step using a APB homogenizer under 3200 psi for two passes under a nitrogen blanket on all product vessels.

The homogenized emulsion may then be subjected to an extrusion step. A dry feed matrix may be added to a Buhler 44 twin screw extruder. The dry feed may contain about 145 g/min. of durum wheat flour. Optional ingredients may include starch, wheat protein, alginate, and wheat protein. The screw speed of the extruder may be about 80 rpm and form 0.5 mm long pellets. The pellets may comprise about 24.9 wt. % water, 11.4 wt. % fish oil, 3.0 wt. % wheat protein, 1.2 wt. % plasticizer, 59.3 wt. % capsule matrix, and 0.2 wt. % Maillose.

The extruded pellets may be surface-dried to remove moisture thereby obtaining a composition containing about 18.0 wt. % water, 12.4 wt. % fish oil, 3.2 wt. % wheat protein, 1.3 wt. % plasticizer, 64.7 wt. % capsule matrix, 0.3 wt. % Maillose.

The dried pellets may then be pan coated. The coating solution may be applied as a fine mist, atomized by nitrogen. The coating solution may contain about 105 g of water and 45 g of purity gum starch. The resulting pan-coated pellets may have a composition of about 22.8 wt. % water, 11.3 wt. % fish oil, 3.0 wt. % wheat protein, 1.2 wt. % plasticizer, 58.8 wt. % capsule matrix, 2.7 wt. % of the coating material, and 0.2 wt. % Maillose.

The coated pellets may be subjected to a final drying step to remove moisture. About 279.8 g of water may be removed to form a final product containing about 7.0 wt. % water, 13.6 wt. % fish oil, 3.6 wt. % wheat protein, 1.4 wt. % plasticizer, 70.8 wt. % matrix material, 3.3 wt. % of the coating material, and 0.3 wt. % Maillose.

EXAMPLE 4

Wheat Protein Emulsion Spray-dried

About 11880 g of deionized water, 2120 g wheat protein, 48 g erythorbic acid, 72 g acidic acid, 161 g starch, and 807 g sucrose are admixed to form a protein solution containing about 79.5 wt. % moisture, 13.3 wt. % wheat protein, 5.3 wt. % plasticizer, 1.0 wt. % starch, and 0.8 wt. % acid. The protein solution may then be subjected to hydrogenation step under refrigeration conditions overnight at a temperature of about 40° F. The hydrated protein solution may be subjected to filtration to remove undissolved protein lumps. Filtration may be through a 100 mesh screen.

About 807 g of omega-3 fish oil and 480 grams of Maillose may be added to the hydrated protein solution to form an emulsion containing 75.9 wt. % water, 5.9 wt. % fish oil, 12.3 wt. % wheat protein, 4.9 wt. % plasticizer, 0.9 wt. % starch, and 1.0 wt. % acid/Maillose. The emulsion may then be subjected to homogenization step using a APV homogenizer under 3000 psi for one pass under a nitrogen blanket on all product vessels.

The emulsion may be spray dried to evaporate moisture resulting in a composition of about 2.5 wt. % water, 20.0 wt. % fish oil, 49.8 wt. % wheat protein, 20.0 wt. % plasticizer, 3.8 wt. % starch, and 3.9 wt. % acids/Maillose. The inlet air temperature during spray-drying is about 200° C. and outlet air temperature is about 110° C.

The spray-dried composition may be subjected to a fluidized bed coating. About 1600 g water, 200 g corn protein, and 200 g propylene glycol may be added as a coating solution applied as a fine mist, atomized by nitrogen. Water may be removed by evaporation to form a final composition a 2.5 wt. % water, 13.2 wt. % fish oil, 32.9 wt. % wheat protein, 2.5 wt. % starch, 16.5 wt. % coating material, 16.5 wt. % propylene glycol, and 2.6 wt. % acids/Maillose.

What is claimed is:

1. A method for encapsulating an encapsulant, comprising:
    admixing an oil component which comprises an encapsulant, with an aqueous component, and a film-forming component to form an emulsion,
    subjecting the emulsion to homogenization to obtain an oil-in-water emulsion comprising oil droplets wherein the oil droplets comprise the encapsulant and have a diameter of less than about 50 microns,
    after said homogenization, admixing the emulsion with a plasticizable matrix material to form a dough, so that the film-forming component forms a film round the oil droplets and encapsulates said encapsulant, wherein said plasticizable matrix material is plasticized by said aqueous component to thereby encapsulate the film-coated oil droplets within said plasticized matrix material,
    forming the dough into pieces, and
    drying the pieces.

2. A method as claimed in claim 1 wherein said film-forming component is water-soluble and comprises a hydrophobic portion.

3. A method as claimed in claim 1 wherein said film-forming component comprises at least one member selected from the group consisting of proteins, hydrocolloids, and starch hydrolyzates.

4. A method as claimed in claim 1 wherein said film-forming component comprises a protein.

5. A method as claimed in claim 4 wherein said protein is hydrated prior to admixing with said oil component.

6. A method as claimed in claim 4 wherein said protein is denatured prior to admixing with said oil component.

7. A method as claimed in claim 4 wherein said protein is admixed with said aqueous component to form an aqueous protein solution having a protein content of from about 1% by weight to about 50% by weight, based upon the total weight of the aqueous component and the protein.

8. A method as claimed in claim 7 wherein said protein solution is heated to denature the protein, the protein is at least substantially completely hydrated, and the hydrated, denatured protein is admixed with said oil component to form said emulsion.

9. A method as claimed in claim 8 wherein the weight ratio of said oil component to said aqueous component in said emulsion is from about 20% by weight to about 49% by weight, based upon the total weight of the oil component and aqueous component.

10. A method as claimed in claim 9 wherein said aqueous protein solution has a protein content of from about 5% by weight to about 25% by weight, based upon the total weight of the aqueous component and the protein.

11. A method as claimed in claim 4 wherein said aqueous component is an aqueous acidic solution, and said protein is dissolved in the aqueous acidic solution.

12. A method as claimed in claim 1 wherein the weight ratio of said oil component to said aqueous component in said emulsion is from about 1% by weight to about 49% by weight, based upon the total weight of the oil component and aqueous component.

13. A method as claimed in claim 1 wherein said emulsion is formed in a high shear mixer and is then subjected to homogenization in a high pressure, multistage homogenizer.

14. A method as claimed in claim 13 wherein said homogenizer reduces the oil droplet size to less than about 2 microns.

15. A method as claimed in claim 13 wherein said homogenizer reduces the oil droplet size so that at least substantially all of the oil droplets have a diameter of less than about 2 microns.

16. A method as claimed in claim 13 wherein said homogenization is carried out under an inert gas blanket or a nitrogen blanket.

17. A method as claimed in claim 13 wherein said emulsion passes through the multistage homogenizer three times.

18. A method as claimed in claim 1 wherein said emulsion is formed and homogenized at a temperature of less than about 60° C.

19. A method as claimed in claim 1 wherein said emulsion is formed and homogenized in an atmosphere at least substantially free of oxygen.

20. A method as claimed in claim 1 wherein said emulsion further comprises an antioxidant for said encapsulant.

21. A method as claimed in claim 20 wherein said antioxidant comprises at least one member selected from the group consisting of L-cysteine, ascorbic acid, tocopherol, and erythobic acid.

22. A method as claimed in claim 20 wherein the amount of said antioxidant is from 10 ppm by weight to about 10,000 ppm by weight, based upon the weight of said oil component.

23. A method as claimed in claim 1 wherein said emulsion further comprises a film-softening component or plasticizer for reducing brittleness of said film-forming component.

24. A method as claimed in claim 23 wherein said film-softening component or plasticizer comprises at least one member selected from the group consisting of monosaccharides, disaccharides, glycerol, and polyethylene glycol.

25. A method as claimed in claim 23 wherein the amount of said film-softening component or plasticizer is from about 1% by weight to about 75% by weight, based upon the weight of said film-forming component.

26. A method as claimed in claim 1 wherein said oil component comprises an oil with an oil-soluble encapsulant.

27. A method as claimed in claim 1 wherein said oil component comprises an oil with a solid encapsulant dispersed in the oil.

28. A method as claimed in claim 27 wherein said solid encapsulant comprises at least one member selected from the group consisting of pharmaceutical compositions, pharmaceutical compounds, nutraceutical compositions, nutraceutical compounds, nutritional components, biologically active components, flavorants, flavorant compositions, fragrances, fragrance compositions, and detergents.

29. A method as claimed in claim 1 wherein said oil component comprises at least one member selected from the group consisting of castor oil, oil containing omega-3 or omega-6 fatty acids, fat-soluble vitamins, gamma linoleic acid, cod liver oil, flavorants, fragrances, active-ingredient containing plant extracts, oil-soluble agricultural components, oil-soluble pharmaceutical components, and oil-soluble bioactive components.

30. A method as claimed in claim 1 wherein said oil component comprises an oil containing omega-3 fatty acids.

31. A method as claimed in claim 30 wherein said film-forming component comprises a whey protein isolate.

32. A method as claimed in claim 30 wherein said film-forming component comprises a whey protein isolate or gluten.

33. A method as claimed in claim 1 wherein said film-forming component comprises a whey protein isolate.

34. A method as claimed in claim 1 wherein said admixing of the emulsion and the plasticizable matrix material is performed in an extruder, the dough is extruded trough a die to obtain an extrudate, the extrudate is cut into pieces, and the pieces are surface dried.

35. A method as claimed in claim 34 wherein said surface drying removes up to about 60% by weight of the moisture content of said pieces.

36. A meted as claimed in claim 34 wherein said surface drying is conducted in an atmosphere which is at least substantially free of oxygen.

37. A method as claimed in claim 34 wherein said surface drying removes up to about 60% by weight of the moisture content of said pieces, said surface drying being conducted so that the product temperature is less than about 40° C.

38. A method as claimed in claim 34, further comprising applying a protective coating to the pieces to obtain pellets, and drying said pellets.

39. A method as claimed in claim 38 wherein said admixing of the emulsion and the matrix material is performed in on extruder, the dough is extruded through a die to obtain an extrudate, the extrudate is cut into said pieces, the pieces are surface dried, said coating which is applied to the pieces is a hydrophilic coating to obtain pellets, and said pellets are dried.

40. A method as claimed in claim 1 wherein said matrix material comprises at least one member selected from the group consisting of durum wheat flour, whey protein isolate, wheat protein, modified or pregelatinized starches, and hydrocolloids.

41. A method as claimed in claim 1 wherein said oil component comprises an oil containing omega-3 fatty acids and said film-forming component comprises a whey protein isolate.

42. A method as claimed in claim 1 wherein said homogenizing is conducted at a pressure of at least about 2,000 psig.

43. A method as claimed in claim 1, wherein said admixing is under low shear and low temperature conditions to plasticize the plasticizable material without substantially destroying the encapsulant and without substantially gelatinizing or cooking the plasticizable matrix material.

44. A method as claimed in claim 1 wherein said aqueous component is water.

45. A method as claimed in claim 1 wherein said oil component is a fish oil containing omega-3 fatty acids.

46. A method as claimed in claim 1 wherein said film-forming component comprises a whey protein isolate or gluten.

47. A method as claimed in claim 1 wherein said oil component is a fish oil containing omega-3 fatty acids and said film-forming component comprises a whey protein isolate or gluten.

48. An edible product for human or animal consumption comprising an encapsulated product, said encapsulated product being obtained by the method of claim 1.

49. A method as claimed in claim 1 wherein the moisture content of the dough is less than about 60% by weight and greater than about 5% by weight, based upon the weight of the dough.

50. A method as claimed in claim 1 wherein said matrix material comprises a durum ingredient or gluten.

51. A method as claimed in claim 1 wherein the amount of said matrix material is about 60% by weight to about 95% by weight, based upon the weight of the final product.

52. A method as claimed in claim 1 wherein said matrix material further comprises a substantially non-plasticizable starch.

53. A method as claimed in claim 1, further comprising applying a protective coating to the pieces to obtain pellets, and drying said pellets.

54. A method as claimed in claim 53 wherein said protective coating is a hydrophilic coating which is applied by pan coating, fluid bed coating, or a rotating enrober drum.

55. A method as claimed in claim 53 wherein said protective coating comprises at least one member selected from the group consisting of an aqueous corn protein solution, a denatured whey protein solution, a film-forming starch solution, and an alginate.

56. A method as claimed in claim 53 wherein said protective coating which is applied to the pieces comprises an alcoholic solution of zein.

57. A method as claimed in claim 53 wherein said extrudate has a moisture content of from about 15% by weight to about 50% by weight, and an oil content of from about 1% by weight to about 35% by weight, based upon the weight of the extrudate.

58. A method as claimed in claim 53, wherein said coating is a hydrophilic coating.

59. A method as claimed in claim 58 wherein said hydrophilic coating is applied to the pieces in an atmosphere which is at least substantially free of oxygen.

60. A method as claimed in claim 1, wherein the film-forming component comprises a protein and the plasticizable matrix material is plasticizable by said aqueous component at a temperature which does not substantially destroy said encapsulant.

61. A method as claimed in claim 1, wherein at least substantially all of the oil droplets have a diameter of less than about 10 microns, said plasticizable matrix material is plasticizable by said aqueous component at a temperature which does not substantially destroy said encapsulant, and said admixing is under low shear and low temperature conditions to plasticize the plasticizable material without substantially destroying the encapsulant and without substantially gelatinizing or cooking the plasticizable matrix material.

62. A method as claimed in claim 1, said matrix material comprises at least one member selected from the group consisting of durum wheat flour, gluten, whey protein isolate, dairy protein, and wheat protein, said oil component comprises a fish oil containing omega-3 fatty acids, and said film-forming component comprises a whey protein isolate or a wheat protein isolate.

63. A method for encapsulating an oil comprising an omega-3 fatty acid comprising:
 a. admixing an oil comprising an omega-3 fatty acid, with an aqueous component, a film-forming component, a film-softening component or plasticizer for reducing brittleness of the film formed from said film-forming component, and an antioxidant for said omega-3 fatty acid, to form an emulsion, said film-forming component comprising a protein,
 b. subjecting the emulsion to homogenization in a homogenizer to obtain an oil-in-water emulsion comprising oil droplets wherein at least substantially all of the oil droplets have a diameter of less than about 50 microns,
 c. after said homogenization, obtaining a dough by admixing ingredients comprising the homogenized oil-in-water emulsion and at least one plasticizable matrix material, wherein said plasticizable matrix material is plasticizable by said aqueous component at a temperature which does not substantially destroy said omega-3 fatty acid, said admixing being under low shear and low temperature conditions to plasticize the plasticizable material without substantially destroying said omega-3 fatty acid and without substantially gelatinizing or cooking the plasticizable matrix material,
 d. forming said dough into pieces, and
 e. drying said pieces.

64. A method as claimed in claim 63 wherein said protein is a whey protein isolate or gluten, and said plasticizable matrix material comprises durum wheat flour.

* * * * *